UNITED STATES PATENT OFFICE.

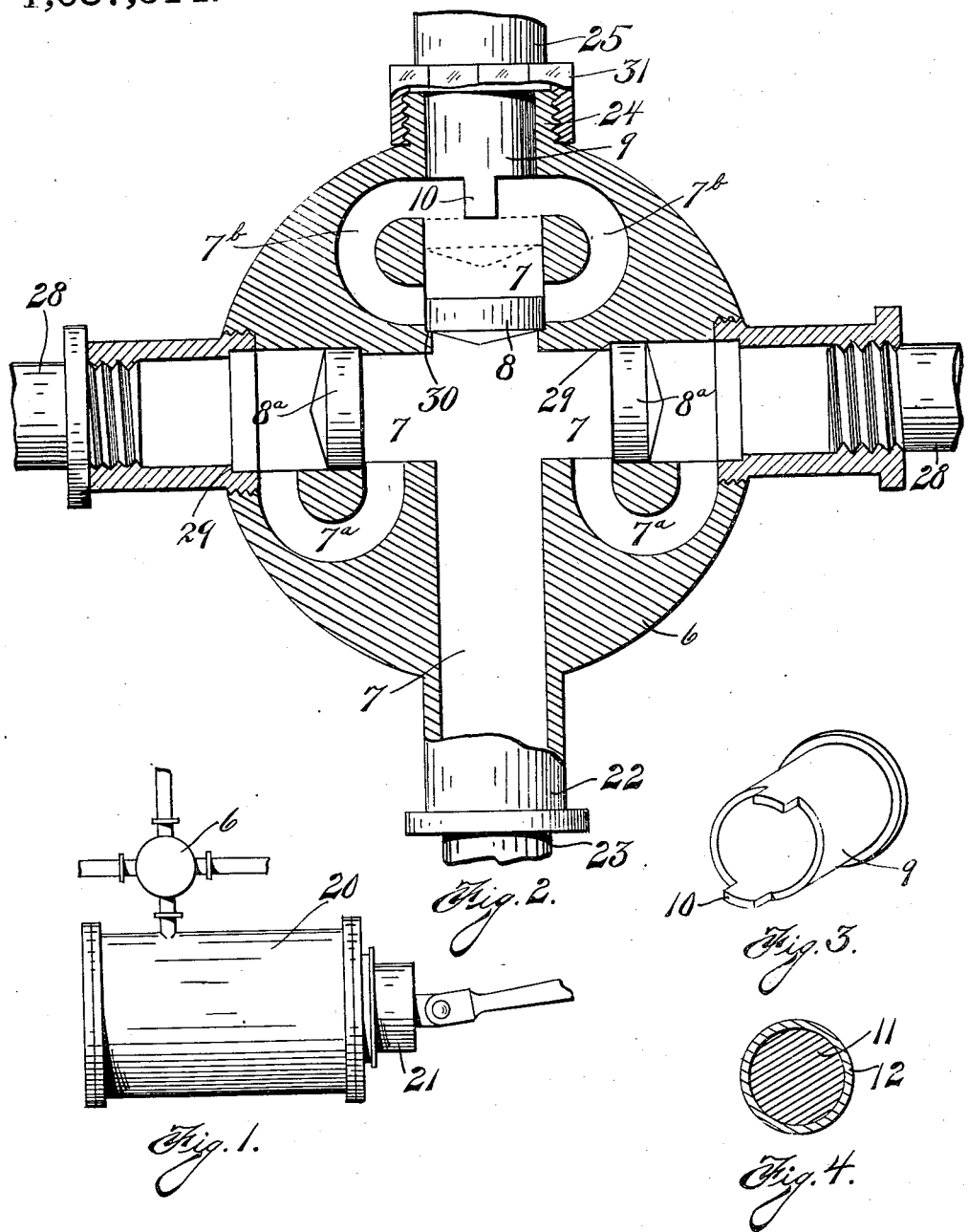

MICHAEL SMOLENSKY, OF CLEVELAND, OHIO.

VALVE FOR PUMPS.

1,087,514.   Specification of Letters Patent.   Patented Feb. 17, 1914.

Application filed April 17, 1913. Serial No. 761,766.

*To all whom it may concern:*

Be it known that I, MICHAEL SMOLENSKY, a subject of the Emperor of Austria-Hungary, residing at Cleveland, in the county of Cuyahoga and State of Ohio, have invented certain new and useful Improvements in Valves for Pumps, of which the following is a specification.

This invention relates to valves for pumps, and it is capable of application to air or gas pumps as well as to liquid pumps.

The object of the invention is to provide an improved construction and arrangement of valves and valve casing, the inlet and outlet valves being contained in a single casing or fitting which is cored out to allow flow around the valves when they are in certain positions, and the valves will operate without the springs or other parts liable to get loose or wear out quickly.

In the accompanying drawings—Figure 1 is a side elevation of a single acting pump provided with the invention. Fig. 2 is an enlarged detail in section of the valve chamber. Fig. 3 is a detail in perspective of a stop at the outlet valve. Fig. 4 is a top view of the outlet valve.

Referring specifically to the drawings, 20 indicates the cylinder of a single acting pump provided with a reciprocating piston 21. The invention may be applied to a double acting pump and therefore no limitation in this respect is implied. The valve casing 6 may be cast in the form of a sphere, for the sake of strength, and it contains passages 7 located at right angles to each other and extending through the casing. At the lower end of the vertical passage 7 is a nipple 22 for connection of the pipe or fitting 23 leading to the cylinder 20. At the other end of the vertical passage 7 is a similar nipple 24 for connection to the outlet pipe 25. The horizontal passage 7 is tapped at its opposite ends to receive the ends of the inlet pipes 28 and the inlet valves 8$^a$ work in the opposite ends of said passage 7 and seat against the inlet pipes when closed. The ends of the passage are counterbored where the valves work, and form shoulders 29 against which the valves stop when they are open. The valves comprise loose plugs and are slidable freely in the bore.

Cored passages 7$^a$ extend from the inlet passages 7 through the body of the casing and around the valves 8$^a$, so that when said valves are opened by the suction the fluid entering through the pipes 28 flows through said passages 7$^a$ to the main passage 7 behind the valves, and when said valves are seated under pressure the outlet of fluid is cut off.

The discharge valve 8 works in a counterbore in the upper part of the vertical passage 7, closing under suction against the shoulder 30, and opening under pressure to contact with projections 10 on a bushing 9 fitting in the upper part of the bore and held there by a nut 31. And passages 7$^b$ are cored in the casing, to extend around the valve 8, when it is opened under pressure, so as to allow flow from the cylinder through the vertical passage 7, the cored passages 7$^b$ and the thimble 9 to the discharge 25.

The valve plugs are preferably constructed as shown in Fig. 4, each consisting of a rubber plug 11 with a conical end, held in a brass ring 12, but other kinds of plugs may be used if desired.

It will be noted that the valves cannot get out of place or become loose or jammed. The whole valve casing for all the valves may be made in one piece, and can be readily attached or detached, and the valve edges are not subject to the destructive action of corrosive liquids or gases, since the flow is around through the ports in the casing, when the valves are opened, rather than immediately beside the valves.

What is claimed as new is:

A valve structure for pumps, comprising an integral casing having communicating bores extending therethrough, and counterbores forming valve seats in said bores, cored passages in the casing communicating at their opposite ends with each bore respectively, and reciprocating valves in the bores, movable to and from the seats, the ends of the cored passages communicating with the bores on opposite sides of the valves when the latter are in open position.

In testimony whereof, I do affix my signature in presence of two witnesses.

MICHAEL SMOLENSKY.

Witnesses:
JOHN A. BOMMHARDT,
J. B. DAVIS.